United States Patent
Nica et al.

(10) Patent No.: US 8,065,269 B2
(45) Date of Patent: Nov. 22, 2011

(54) IMMEDIATE MAINTENANCE OF MATERIALIZED VIEWS

(75) Inventors: Anisoara Nica, Ontario (CA); Evguenia Eflov, Ontario (CA)

(73) Assignee: iAnywhere Solutions, Inc., Dublin, CA (US)

( * ) Notice: Subject to any disclaimer, the term of this patent is extended or adjusted under 35 U.S.C. 154(b) by 342 days.

(21) Appl. No.: 12/339,430

(22) Filed: Dec. 19, 2008

(65) Prior Publication Data

US 2010/0161555 A1     Jun. 24, 2010

(51) Int. Cl.
*G06F 17/00*     (2006.01)

(52) U.S. Cl. ........ 707/625; 707/610; 707/690; 707/736; 709/248

(58) Field of Classification Search .................. None
See application file for complete search history.

(56) References Cited

U.S. PATENT DOCUMENTS

| | | | | |
|---|---|---|---|---|
| 6,125,360 | A * | 9/2000 | Witkowski et al. | 1/1 |
| 6,134,543 | A * | 10/2000 | Witkowski et al. | 1/1 |
| 6,353,828 | B1 * | 3/2002 | Ganesh et al. | 1/1 |
| 6,484,159 | B1 * | 11/2002 | Mumick et al. | 1/1 |
| 6,546,402 | B1 * | 4/2003 | Beyer et al. | 707/625 |
| 6,708,179 | B1 * | 3/2004 | Arora | 1/1 |
| 6,882,993 | B1 * | 4/2005 | Lawande et al. | 707/714 |
| 7,020,649 | B2 * | 3/2006 | Cochrane et al. | 1/1 |
| 7,111,020 | B1 * | 9/2006 | Gupta et al. | 1/1 |
| 7,467,128 | B2 * | 12/2008 | Larson et al. | 1/1 |
| 7,734,602 | B2 * | 6/2010 | Folkert et al. | 707/696 |
| 7,822,712 | B1 * | 10/2010 | Robinson et al. | 707/624 |
| 7,895,186 | B2 * | 2/2011 | Yu | 707/713 |

OTHER PUBLICATIONS

Hanov et al, "Refactoring MySQL to Support Materialized Views", University of Waterloo, 2008.*
Yeung et al, "Multiagent Immediate Incremental View Maintenance for Data Warehouses", IEEE Transactions on Systems, vol. 35, No. 2, Mar. 2005.*

* cited by examiner

*Primary Examiner* — Apu Mofiz
*Assistant Examiner* — Hung Le
(74) *Attorney, Agent, or Firm* — Sterne, Kessler, Goldstein & Fox PLLC (57) ABSTRACT

A system, method, and computer program product are provided for immediately updating a materialized view in a relational database management system. The method includes the steps of creating a materialized view defined over a base table, executing an update statement on the base table, computing a delta of the base table by comparing images of the base table before execution of the update statement and after execution of the update statement, computing a delta of the materialized view based on the delta of the base table, and updating the materialized view using the delta of the materialized view.

18 Claims, 6 Drawing Sheets

IMMEDIATE MAINTENANCE OF MATERIALIZED VIEWS

BACKGROUND OF INVENTION

1. Field of the Invention

The present invention relates generally to databases and, more specifically, to relational databases providing materialized views.

2. Description of the Background Art

A relational database management system ("DBMS") is a database model that defines relationships between attributes within a relation table. A query is performed on the DBMS in order to obtain a subset of data within the database that addresses a request represented by the query. A result provided by the DBMS as a response to the query can itself be represented as a table. For example, a query on a table "T" having five columns labeled "A", "B", "C", "D", and "E", respectively, may identify a subset of the five columns as containing desired information. The example query:

select A, B from T where A='Sybase' would produce a result that can be interpreted as a two-column table, having columns "A" and "B", which would be populated only by rows in which the value of column "A" was 'Sybase' in base table "T"

A temporary table created as a result of a query is commonly referred to as a "view," although different database vendors may refer to similar such constructs using other names.

Materialized views go one step further and cache or otherwise store the temporary table as its own entity, separate from the underlying base tables which contain the queried data. Again, different database vendors may refer to similar such constructs using other names, including "summary tables," "staging tables," and "indexed views." By caching the results of a query, these results themselves can be the subject of additional queries without resolving the potentially costly original query again. One skilled in the relevant arts will appreciate that a number of applications are able to take advantage of materialized views in order to significantly improve performance.

A problem arises when an underlying base table which was queried to create materialized view is itself updated. An update of a base table has the potential to render the materialized view obsolete. While this tradeoff may be acceptable in certain contexts, such as when base tables are rarely updated, or when obsolescence of the materialized view is irrelevant to an operation, other contexts require that the materialized view accurately reflect the current state of the database and its underlying base tables.

One solution is to defer maintenance of the materialized view until some future time. For example, some current systems require a user to initiate maintenance of the materialized view through, for example, a "refresh" statement. Although this may again be acceptable in certain contexts, other contexts may require immediate maintenance of materialized views, or "immediate materialized views" ("iMV"). Again, different database vendors may refer to similar such constructs using other names, including "immediately maintained materialized views."

An iMV is used in contexts where the data within the iMV must always accurately reflect the data in its underlying base tables. Accordingly, when the underlying base tables referenced by an iMV are updated, the iMV should immediately reflect any such applicable changes immediately.

Current database systems implementing iMVs provide for maintenance of the iMVs through either recomputation or incremental maintenance. Recomputation involves the recreation of the entire iMV whenever an underlying base table is updated, typically by recomputing the original query used to generate the iMV. This operation can be costly, and may even defeat the usefulness of the iMV in contexts where frequent updates of the underlying base tables are expected. A preferred solution is to perform incremental updates on the iMV by propagating only the changes caused by an update to an underlying base table to the iMV itself. However, this solution is unavailable in many contexts in current database systems, as it may be difficult to determine precisely what has been updated. For this reason, although incrementally updating the iMV would typically be more desirable than recomputation of the iMV, the option to use an incremental update is often unavailable.

Accordingly, what is desired is a means to enable immediate incremental updates of an iMV that is available in additional contexts with fewer restrictions.

SUMMARY OF INVENTION

Embodiments of the invention include a method for immediately updating a materialized view in a relational database management system. The method includes the steps of creating a materialized view defined over a base table, executing an update statement on the base table, computing a delta of the base table by comparing images of the base table before execution of the update statement and after execution of the update statement, computing a delta of the materialized view based on the delta of the base table, and updating the materialized view using the delta of the materialized view.

Embodiments of the invention additionally include a system for immediately updating a materialized view in a relational database management system. The system includes a first creating module for creating a materialized view defined over a base table, an executing module for executing an update statement on the base table, a first computing module for computing a delta of the base table by comparing images of the base table before execution of the update statement and after execution of the update statement, a second computing module for computing a delta of the materialized view based on the delta of the base table, and an updating module for updating the materialized view using the delta of the materialized view.

Embodiments of the invention further include a computer program product comprising a computer-usable medium having computer program logic recorded thereon for enabling a processor to immediately update a materialized view in a relational database management system. The computer program logic includes first creating means for enabling a processor to create a materialized view defined over a base table, executing means for enabling a processor to execute an update statement on the base table, first computing means for enabling a processor to compute a delta of the base table by comparing images of the base table before execution of the update statement and after execution of the update statement, second computing means for enabling a processor to compute a delta of the materialized view based on the delta of the base table, and updating means for enabling a processor to update the materialized view using the delta of the materialized view.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Figure 1:
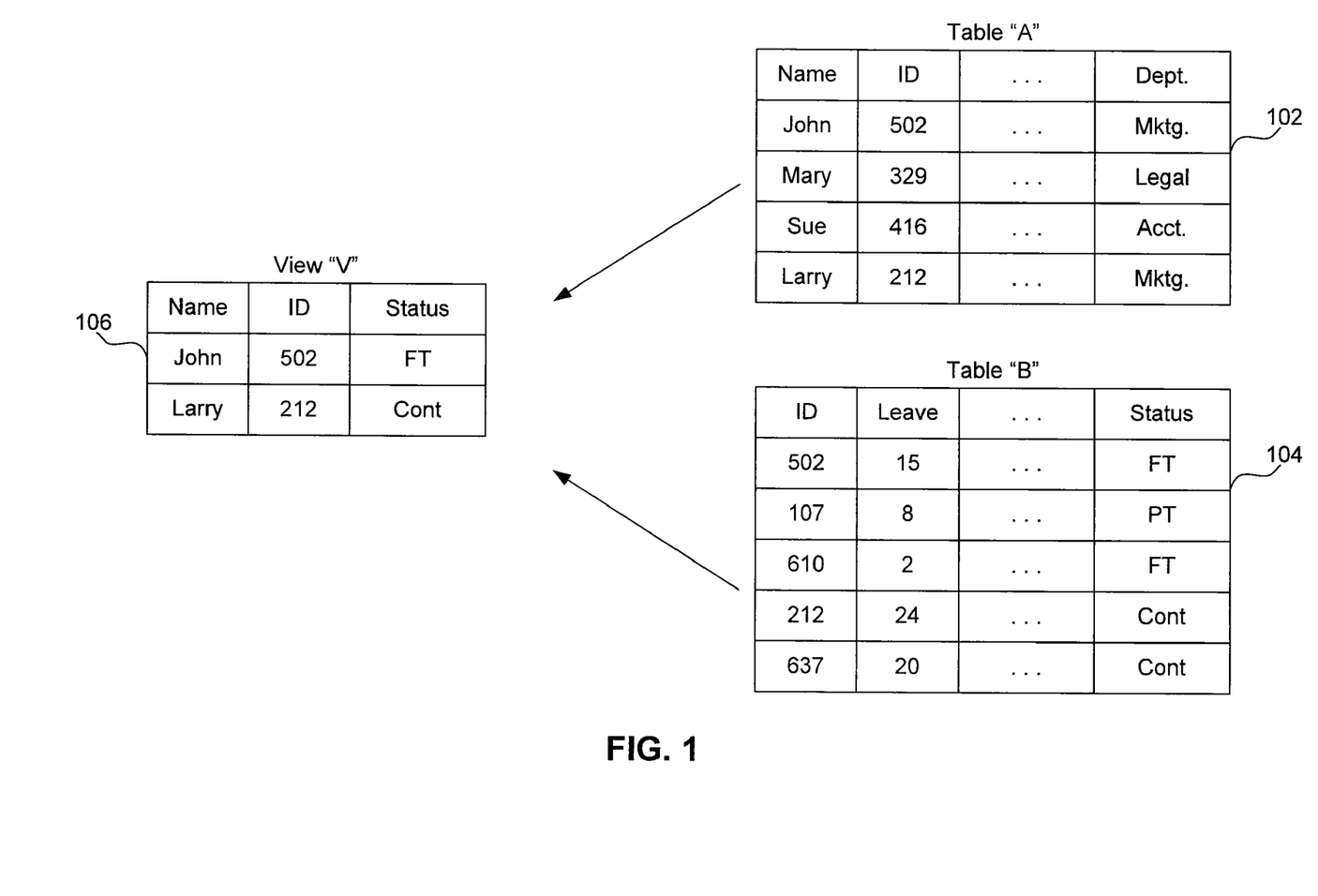
FIG. 1 is an example layout of a database with two tables, in accordance with an embodiment of the present invention.

FIG. 1 is an example layout of a database 100 with two tables, table "A" 102 and table "B" 104, in accordance with an embodiment of the present invention. One skilled in the relevant arts will appreciate that the representation of a database through the use of tables is by way of example, and not limitation. Table "A" is shown as having at least three columns, labeled "Name", "ID", and "Department.". Table "B" is shown as having at least three columns, labeled "ID", "Leave", and "Status". View 106 is a view "V" of a set of data from tables "A" and "B". As shown in FIG. 1, view "V" 106 represents, for example, a view of the "Name", "ID", and "Status" columns for all rows in which the "Department" column has the value 'mktg.'. Although other queries may produce a similar view 106 based on the data from base tables "A" and "B", one possible query that would create view 106 would be:

```
SELECT A.Name, A.ID, B.Status
FROM A, B
WHERE A.ID = B.ID AND A.Department = 'mktg.'
```

The resulting view 106 from executing the above query is usually temporary in nature. The view 106 can be displayed, for example, in tabulated form on a user console. The view 106 can also be used by an additional query, such as in the case where the above query is nested within another query. One skilled in the relevant arts will appreciate that additional uses for temporary views exist, and the above are presented by way of example, and not limitation.

The performance of certain applications can be improved by performing additional queries on a view, such as view 106, rather than through constant querying of the base tables. For example, if a number of queries needed to be run on only those entries where the column "Department" is 'mktg.' (e.g., a query on all employees of a marketing department, selected from a list of company-wide employees), it may be beneficial to preserve the view "V" 106 and perform additional queries on it, rather than repeatedly querying potentially large base tables "A" and "B". Such a persistent view is commonly termed a materialized view.

A problem with this approach is that the materialized view may become obsolete if there is an update to the base tables, such as base tables "A" and "B". For example, if a new marketing employee, Gary, joins the company, then the view 106 should reflect Gary's name, employee ID, and employee status. Implementations which update the view "V" 106 at some future point, often through a query requesting a refresh of the view, are deferred materialized views. The present invention is primarily directed to immediate materialized views ("iMV"), which are updated immediately upon a change to the base tables. This allows the iMV to be used under the assumption that the data it contains is always valid.

II. Immediate Updates on Materialized Views

Figure 2:
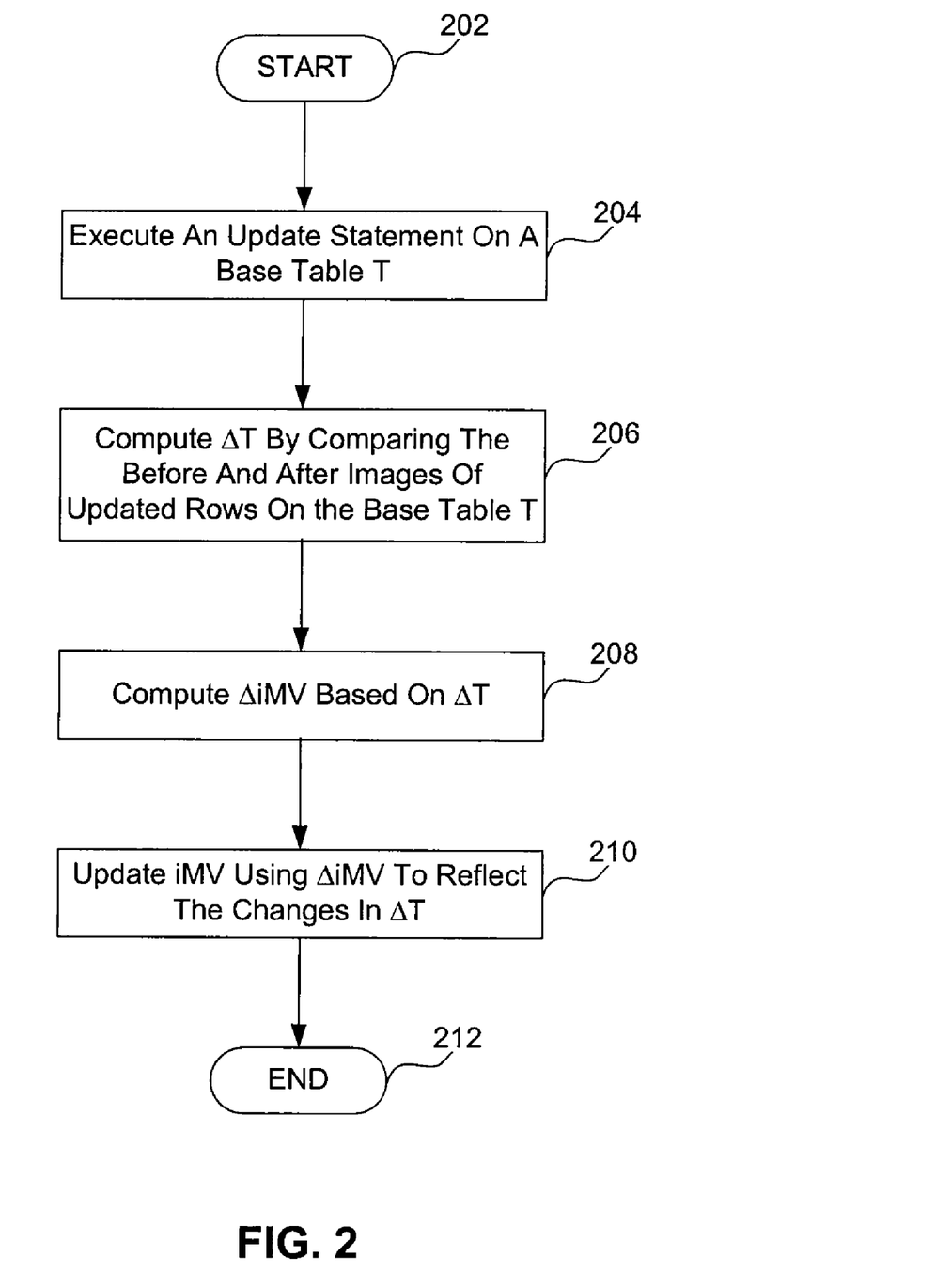
FIG. 2 is a flowchart illustrating steps by which a materialized view is immediately updated in order to reflect changes in its base tables, in accordance with an embodiment of the present invention.

FIG. 2 is a flowchart 200 illustrating steps by which a materialized view is immediately updated in order to reflect changes in its base tables, in accordance with an embodiment of the present invention. The method begins at step 202 and proceeds to step 204 where an update statement is executed on a base table "T".

In order to update the iMV to reflect the update to base table "T", it is possible to rebuild the view from scratch, using the original query used to create it. The computational cost of rebuilding the view, however, may be excessive, in which case it is beneficial to update only that data in the iMV which has been affected by the update to base table "T". At step 206, a ΔT is computed by comparing before-and-after images of the updated rows on base table "T". This operation is defined, in accordance with an embodiment of the present invention, as follows:

```
ΔT (c1, c2, . . ., operation) as
SELECT T.c1, T.c2, . . ., 'D' FROM before_T
UNION ALL
SELECT T.c1, T.c2, . . ., 'I' FROM after_T
```

This query will generate a ΔT result table that comprises all of the column headings from base table T, both before and after, as well as an annotation indicating whether a row was selected from the before_T table or the after_T table. One skilled in the relevant arts will recognize that other annotations may be used, and the use of 'D' and 'I' is by way of example, and not limitation.

Referring back to FIG. 1, if base table "A" 102 had a new entry, say 'Gary', '220', 'mktg.', for the corresponding columns shown in FIG. 1, then it would be necessary to perform an update of view "V" 106 so that it would reflect the current state of the underlying base tables. The above operation would then be structured, in accordance with this example, as follows:

```
ΔA (Name, ID, Department, operation) as
SELECT A.Name, A.ID, A.Department, 'D' FROM before_A
UNION ALL
SELECT A.Name, A.ID, A.Department, 'I' FROM after_A
```

The result would be a table having column headings for the employee name, ID, and department, as well as for the annotation. The tables "before_A" and "after_A" represent images of the rows changed by an update operation, in our example an insert of a new row ('Gary', '220', 'mktg.'). Hence, "before_A" is empty, as no existing rows were changed, "after_A" contains exactly one row for Gary, while ΔA contains one row with the annotation of 'I', ('Gary', '220', 'mktg.', 'I'). One skilled in the relevant arts will recognize that any updates, including additions, deletions, and modifications, would be evident by the comparison of rows annotated as originating before the update to those originating after the update. This result table is the ΔT of step 206.

At step 208, it is then possible to compute a ΔiMV based on the ΔT. This is accomplished by first joining the ΔT table with any other base tables used in the iMV. In the example shown in FIG. 1, the ΔA (i.e., the delta of base table "A" 102) is joined with the necessary data from table "B" 104. This ΔJOIN operation is defined, in accordance with this example, as follows:

```
ΔJoin (Name, ID, Status, operation) as
SELECT ΔA.Name, ΔA.ID, B.Status, ΔA.operation
FROM ΔA, B
WHERE ΔA.ID = B.ID AND ΔA.Department= 'mktg.'
```

As a result, a table is created which holds only those columns which are present in the view "V" 106, plus the annotation for each row. This operation is generalized, in accordance with an embodiment of the present invention, as follows:

```
ΔJOIN (R1.c1, R2.c4, . . .,
        ΔT.c1, ΔT.c2, . . ., ΔT.operation) as
SELECT R1.c1, R2.c4, . . .
        ΔT.c1, ΔT.c2, . . ., ΔT.operation
FROM R1, R2, . . ., ΔT
WHERE p'
```

The above generalization has several components. The list "R1.c1, R2.c4, . . . " is intended to represent those additional base tables which are used to constitute the iMV. As the view may not contain all columns of these base tables, only those columns represented in the iMV are selected. The columns are joined with the ΔT table using a condition p'. Condition p' is representative of the same condition used to create the iMV by joining base table "T" with tables "R1", "R2", etc., but substituting ΔT and its columns for any instant of base table "T" and its columns within the original condition. One skilled in the relevant arts will appreciate that the condition need not be a WHERE clause, and the above generalization is presented by way of example, and not limitation.

It is then possible to create a ΔiMV based on the original query for the iMV. Assuming the original query used to create the iMV was of the form:

```
SELECT e1, e2, . . ., eN, SUM(a1), SUM(a2), . . ., SUM(aM), count(*)
FROM R1, R2, . . ., Rk, T
WHERE p
GROUP BY g1, g2, . . ., gN
``` it is then possible to create a ΔiMV using a similar form as the original query, incorporating the ΔJOIN operation above. By way of example, and not limitation, a generalized ΔiMV for the above query would take the form:

```
ΔiMV (e1, e2, . . ., sum1, sum2, . . ., sum, count) AS
SELECT e1', e2', . . .,
SUM(a1' * (if operation='D' then -1 else +1 endif) ),
SUM(a2' * (if operation='D' then -1 else +1 endif) ),
  . . .
SUM(if operation='D' then -1 else +1 endif) AS count
FROM ΔJOIN
GROUP BY g1', g2', . . ., gN'
```

Each of the columns in e1', e2', etc. and g1', g2', etc. would be replaced with columns from ΔJOIN, rather than using the original columns from the original query.

Continuing from the earlier example using the tables shown in FIG. 1, the ΔiMV operation would be as follows:

```
SELECT Name, ID, Status,
SUM(if operation='D' then -1 else +1 endif) AS count
FROM ΔJOIN
GROUP BY Name, ID, Status
```

The resulting table would again list the name, ID, and status fields from the ΔJOIN table, but would group duplicate entries of those fields into a same row, and providing a summation of the attributes for each entry. As a result, wherever the sum of the attribute "count" is 0, then there has been no change to a row, and wherever the sum of the attribute "count" is -1, there has been a deletion or an update. If the sum of the attribute "count" is +1, then the row was inserted or updated.

At step 210, this count is used to update the iMV using the ΔiMV table. This is accomplished through the use of a MERGE statement By way of example, and not limitation, the MERGE statement is discussed in the context of feature T313, "Enhanced MERGE statement" of the ANSI SQL 2008 standard, though one skilled in the relevant arts will appreciate that additional implementations of the below functionality can achieve the same result through other means.

A generalized statement for merging the ΔiMV into the iMV, in accordance with an embodiment of the present invention, is provided by way of example:

```
MERGE INTO iMV USING ΔiMV
ON (iMV.pk = ΔiMV.pk)
    IF MATCHED AND ΔiMV.count + iMV.count = 0 THEN DELETE
    IF MATCHED AND ΔiMV.count + iMV.count > 0 THEN UPDATE
        SET iMV.count = iMV.count+ ΔiMV.count, . . .
    IF NOT MATCHED THEN INSERT VALUES (ΔiMV.c1, . . .)
```

In the above example, iMV.pk and ΔiMV.pk indicate the matching of a primary key. In the previous example based on FIG. 1, the primary key could be the "ID" field. If the ΔiMV count is −1, and the iMV count is 1 for a matched row, the result of the summation will be 0. This indicates that a row was present in iMV, but was marked deleted in ΔiMV. Accordingly, the row is deleted from the iMV. If the sum of the ΔiMV count and the iMV count is greater than zero for a matched row, the row is updated in the iMV. However, if there is no match for a row from ΔiMV in iMV, then the row is inserted into iMV. The method then ends at step 212.

III. Triggers and Propagate-Apply

The MERGE statement of Section II is termed a propagate-apply statement, in that it is responsible for propagating and applying the changes from ΔiMV to the iMV. In accordance with an embodiment of the present invention, each propagate-apply statement for an iMV is generated just once during a server session and is saved in the iMV's heap. One skilled in the relevant arts will appreciate that additional methods for performing propagate-apply functionality can be used.

Figure 3:
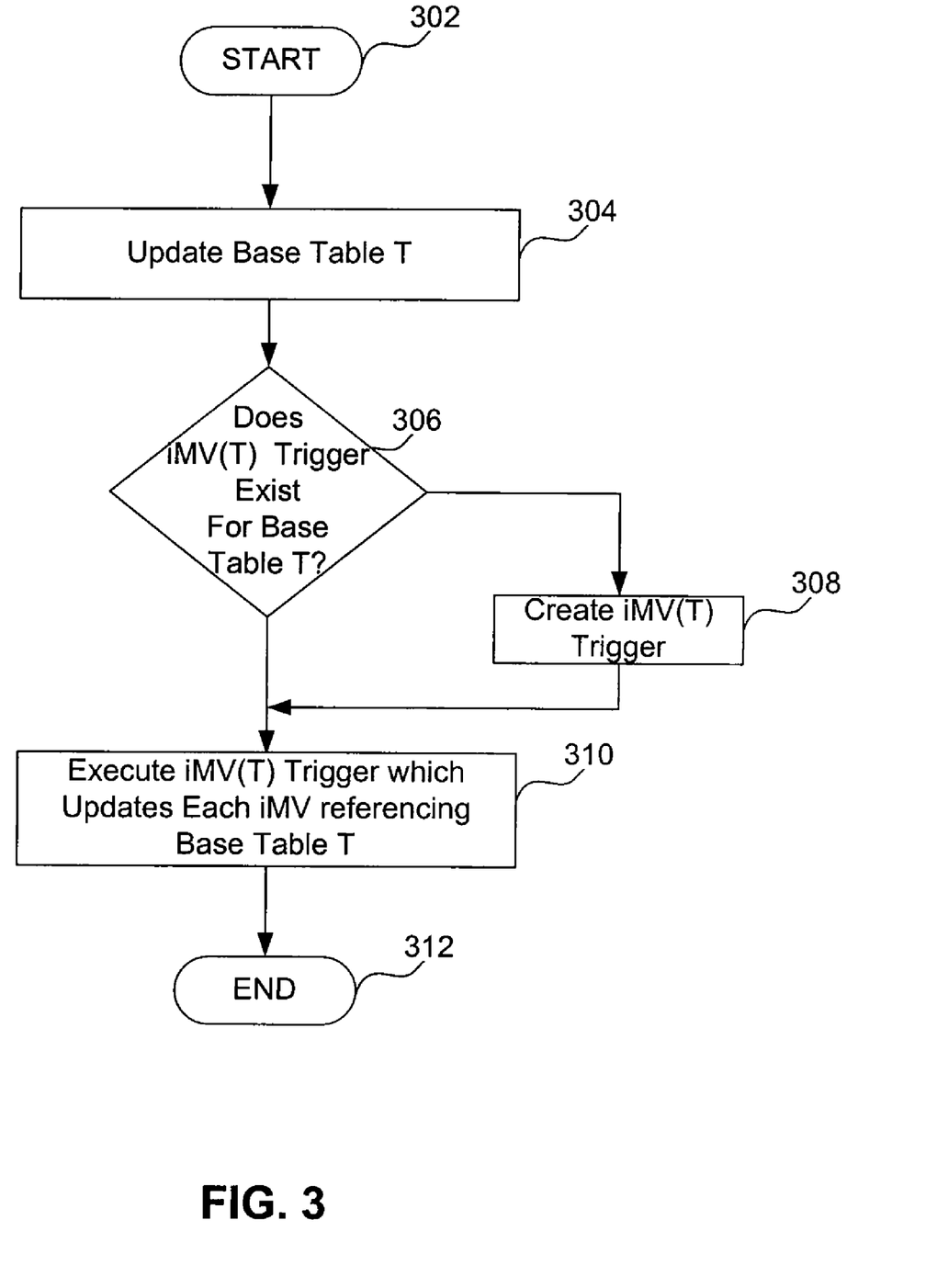
FIG. 3 is a flowchart illustrating the steps by which triggers can be used to provide immediate materialized views, in accordance with an embodiment of the present invention.

Propagate-apply statements are effectuated through the use of triggers, in accordance with an embodiment of the present invention. By using a trigger containing the propagate-apply statements, they can be run immediately upon updating a base table, thereby providing "immediate" materialized views. FIG. 3 is a flowchart 300 illustrating the steps by which triggers can be used to provide immediate materialized views, in accordance with an embodiment of the present invention. The method begins at step 302 and proceeds to step 304 where a base table "T" is updated. At step 306, a decision is made as to whether a trigger iMV(T) already exists for base table "T". If not, the trigger is created at step 308. The trigger is designed to perform the steps shown as steps 206, 208, and 210 of FIG. 2, and can be generated once per server session, in accordance with an embodiment of the present invention. The trigger contains a propagate-apply statement (e.g., a MERGE statement) for each immediate materialized view referencing the table "T". At step 310, the trigger is executed in order to update the iMVs, and the method ends at step 312.

Figure 4:
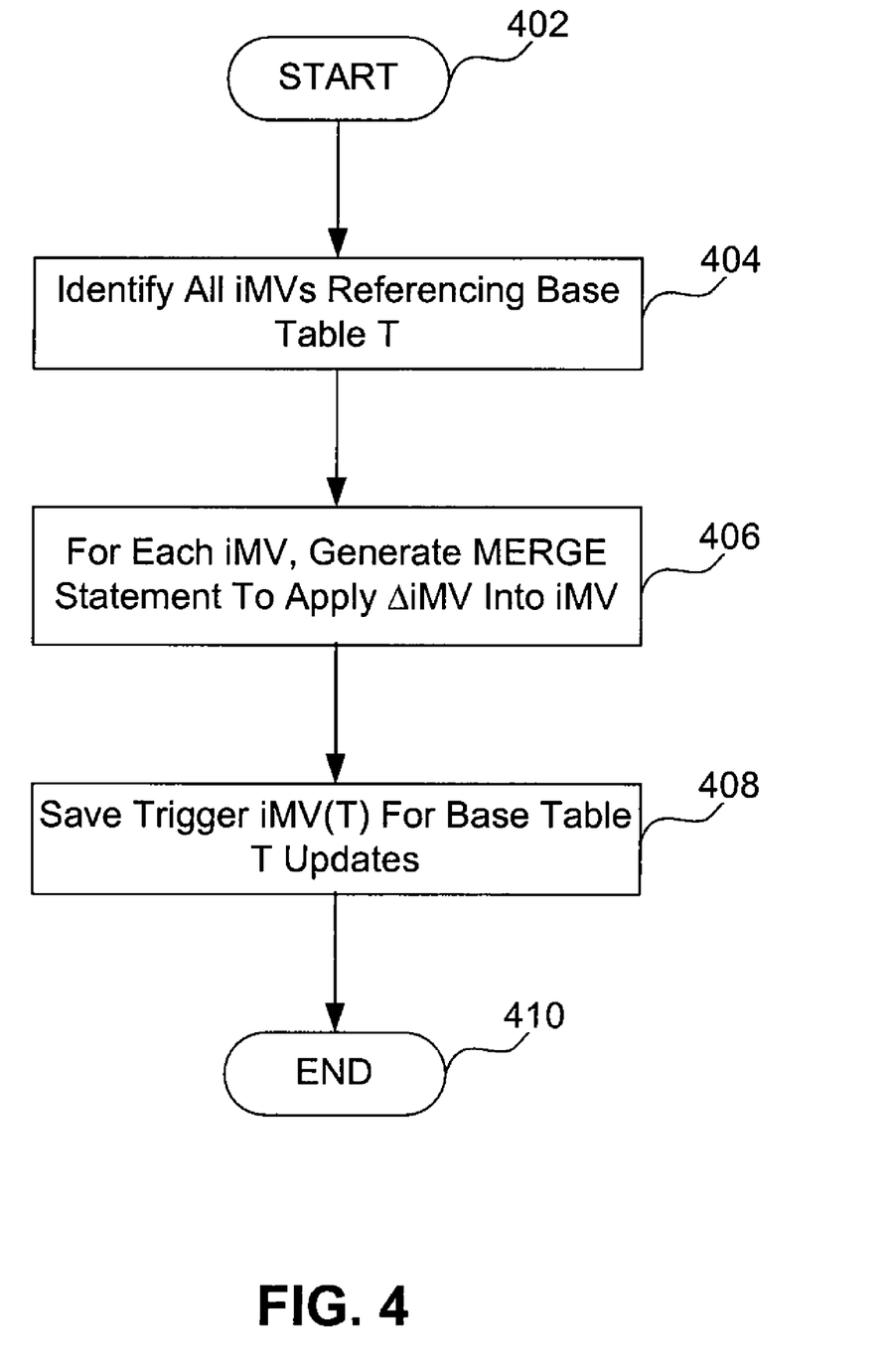
FIG. 4 is a flowchart illustrating steps by which propagate-apply statements are generated for the triggers, in accordance with an embodiment of the present invention.

FIG. 4 is a flowchart 400 illustrating steps by which propagate-apply statements are generated for the triggers, in accordance with an embodiment of the present invention. The method begins at step 402 and proceeds to step 404 where all iMVs referencing the subject base table "T" are identified. Then, for each iMV, a MERGE statement, or other propagate-apply statement, is generated in order to apply a ΔiMV into the iMV. At step 408, the trigger is saved to that it can be used throughout the server session, in accordance with an embodiment of the present invention. The method ends at step 410.

IV. Example Database System

Figure 5:
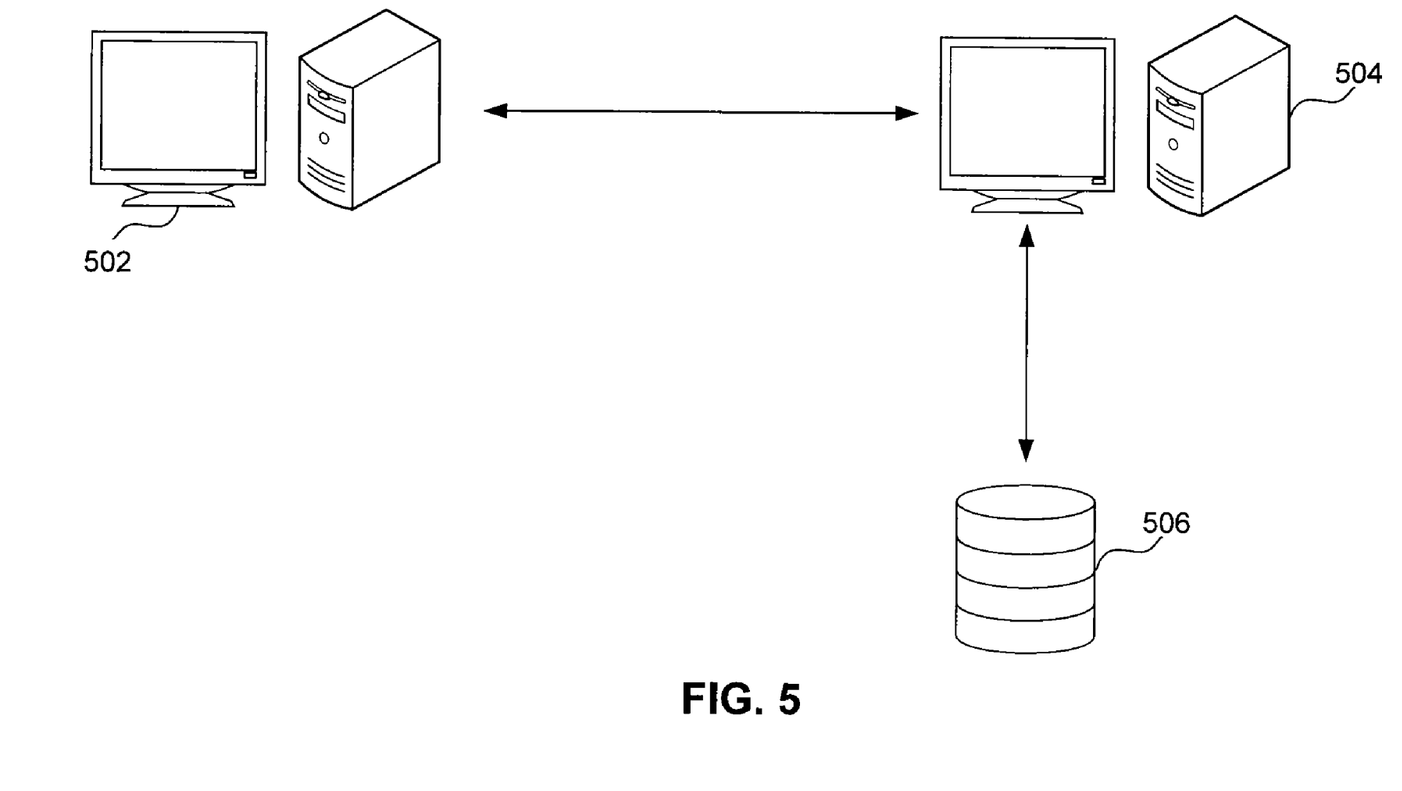
FIG. 5 is an exemplary database system, in accordance with an embodiment of the present invention.

FIG. 5 is an exemplary database system 500, in accordance with an embodiment of the present invention. System 502 is a client system operable to interface with server system 504, which hosts and communicates with database 506. One skilled in the relevant arts will recognize that the functionality of database system 500, and each individual component thereof, can reside on one or more physical computer systems, and database system 500 is provided by way of example, and not limitation.

In accordance with an embodiment of the present invention, database 506 is a relational database management system, such as SQL Anywhere server provided by Sybase, Inc. of Dublin, Calif.

V. Example Computer System Implementation

Figure 6:
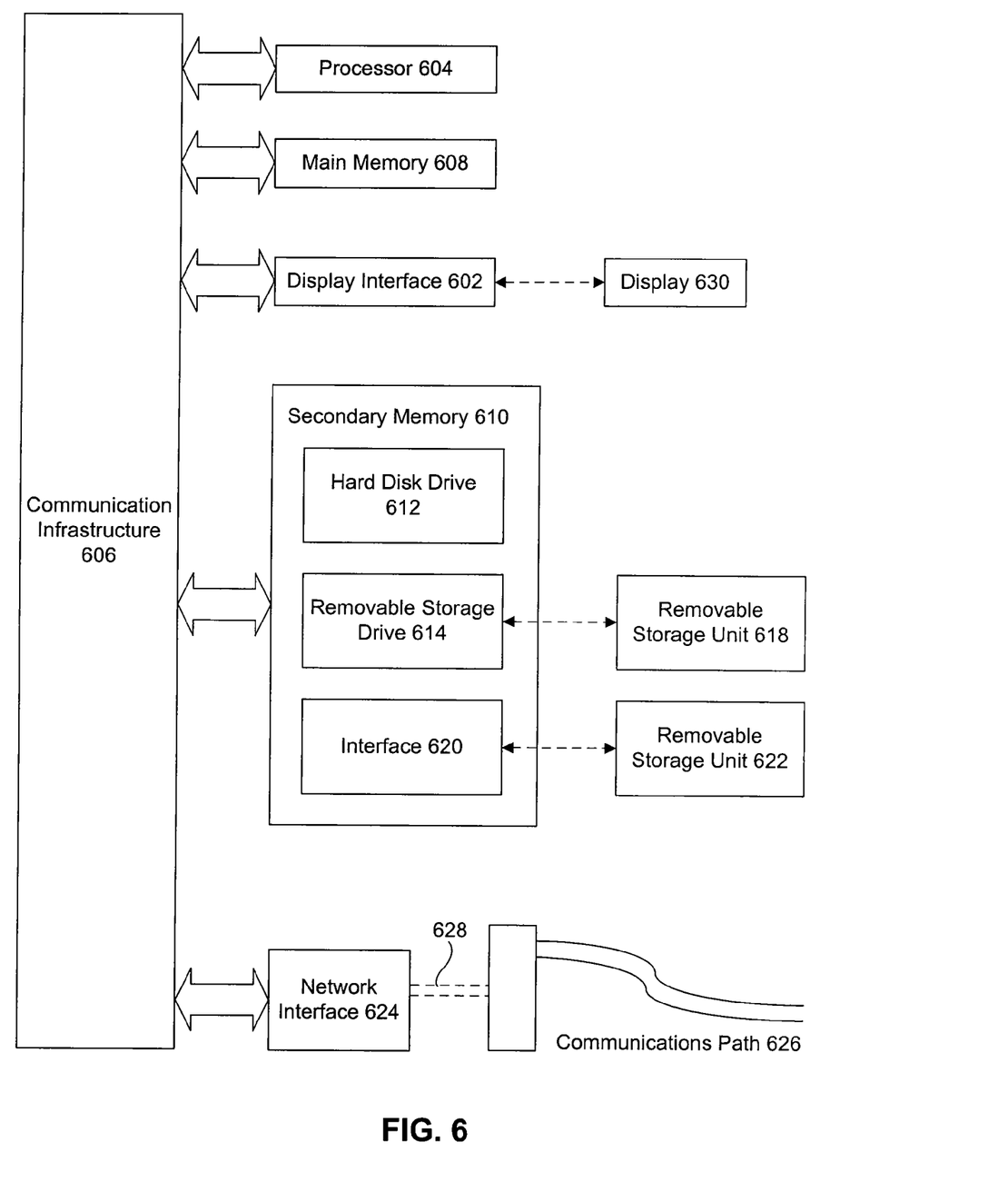
FIG. 6 depicts an example computer system in which embodiments of the present invention may be implemented.

Various aspects of the present invention can be implemented by software, firmware, hardware, or a combination thereof. FIG. 6 illustrates an example computer system 600 in which the present invention, or portions thereof, can be implemented as computer-readable code. For example, the methods illustrated by flowcharts 200 of FIG. 2, 300 of FIG. 3 and 400 of FIG. 4, can be implemented in system 600. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612, a removable storage drive 614, and/or a memory stick. Removable storage drive 614 may comprise a floppy disk drive, a magnetic tape drive, an optical disk drive, a flash memory, or the like. The removable storage drive 614 reads from and/or writes to a removable storage unit 618 in a well known manner. Removable storage unit 618 may comprise a floppy disk, magnetic tape, optical disk, etc. which is read by and written to by removable storage drive 614. As will be appreciated by persons skilled in the relevant art(s), removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals which may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612.

Signals carried over communications path 626 can also embody the logic described herein. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor 604 to implement the processes of the present invention, such as the steps in the methods illustrated by flowcharts 200 of FIG. 2, 300 of FIG. 3, and 400 of FIG. 4, discussed above. Accordingly, such computer programs represent controllers of the computer system 600. Where the invention is implemented using software, the software may be stored in a computer program product and loaded into computer system 600 using removable storage drive 614, interface 620, hard drive 612 or communications interface 624.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for immediately updating a materialized view in a relational database management system, comprising:
creating a materialized view defined over a base table;
executing an update, insert, or delete statement on the base table;
computing a delta of the base table by comparing images of the base table before execution of the statement and after execution of the statement, and providing row annotations denoting whether corresponding rows of the delta of the base table originated in the image of the base table before execution of the statement, or in the image of the base table after execution of the statement;
computing a delta of the materialized view based on the delta of the base table, comprising computing aggregations of the row annotations to identify row deletions or insertions; and
updating the materialized view using the delta of the materialized view.

2. The method of claim 1, wherein the step of updating the materialized view comprises:
processing a propagate-apply instruction on the materialized view using the delta of the materialized view.

3. The method of claim 2, wherein the propagate-apply instruction is a merge instruction.

4. The method of claim 2, wherein the propagate-apply instruction is processed responsive to processing a trigger associated with the base table.

5. The method of claim 4, further comprising:
determining whether the trigger exists for the base table upon executing the statement on the base table; and
if the trigger does not exist, creating the trigger and the propagate-apply instruction.

6. The method of claim 1, wherein the materialized view is further defined over one or more additional base tables.

7. A system for immediately updating a materialized view in a relational database management system, comprising:
a memory configured to store modules comprising:
a first creating module for creating a materialized view defined over a base table,
an executing module for executing an update, insert, or delete statement on the base table,
a first computing module for computing a delta of the base table by comparing images of the base table before execution of the statement and after execution of the statement, and providing row annotations denoting whether corresponding rows of the delta of the base table originated in the image of the base table before execution of the statement, or in the image of the base table after execution of the statement,
a second computing module for computing a delta of the materialized view based on the delta of the base table, comprising computing aggregations of the row annotations to identify row deletions or insertions, and
an updating module for updating the materialized view using the delta of the materialized view; and
one or more processors configured to process the modules.

8. The system of claim 7, wherein the step of updating module comprises:
a processing module for processing a propagate-apply instruction on the materialized view using the delta of the materialized view.

9. The system of claim 8, wherein the propagate-apply instruction is a merge instruction.

10. The system of claim 8, wherein the propagate-apply instruction is processed responsive to processing a trigger associated with the base table.

11. The system of claim 10, further comprising:
a determining module for determining whether the trigger exists for the base table upon executing the statement on the base table; and
a second creating module for creating the trigger and the propagate-apply instruction if the trigger does not exist.

12. The system of claim 7, wherein the materialized view is further defined over one or more additional base tables.

13. A computer-usable medium having computer program logic recorded thereon for immediately updating a materialized view in a relational database management system, execution of which, by a computing device, causes the computing device to perform operations comprising:
creating a materialized view defined over a base table;
executing an update, insert, or delete statement on the base table;

computing a delta of the base table by comparing images of the base table before execution of the statement and after execution of the statement, and providing row annotations denoting whether corresponding rows of the delta of the base table originated in the image of the base table before execution of the statement, or in the image of the base table after execution of the statement;

computing a delta of the materialized view based on the delta of the base table, comprising computing aggregations of the row annotations to identify row deletions or insertions; and updating the materialized view using the delta of the materialized view.

14. The computer-usable medium of claim 13, wherein updating the materialized view comprises:

processing a propagate-apply instruction on the materialized view using the delta of the materialized view.

15. The computer-usable medium of claim 14, wherein the propagate-apply instruction is a merge instruction.

16. The computer-usable medium of claim 14, wherein the propagate-apply instruction is processed responsive to processing a trigger associated with the base table.

17. The computer-usable medium of claim 16, the operations further comprising:

determining whether the trigger exists for the base table upon executing the statement on the base table; and creating the trigger and the propagate-apply instruction if the trigger does not exist.

18. The computer-usable medium of claim 13, wherein the materialized view is further defined over one or more additional base tables.

\* \* \* \* \*